A. Codding Jr.
Bracelet.
N° 91,604.  Patented Jun. 22, 1869
Fig: 1.
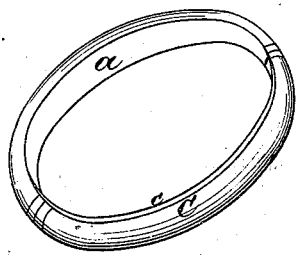
Fig: 2.   Fig: 3.
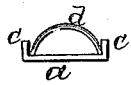   
Fig: 4.
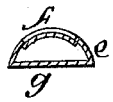
Witnesses.
A. W. Almquist
Wm A Magan
Inventor.
Abiel Codding Jr
Per Munn & Co
Attys

UNITED STATES PATENT OFFICE.

ABIEL CODDING, JR., OF NORTH ATTLEBOROUGH, MASSACHUSETTS.

IMPROVEMENT IN THE MANUFACTURE OF ENAMELED BRACELETS.

Specification forming part of Letters Patent No. 91,604, dated June 22, 1869.

*To all whom it may concern:*

Be it known that I, ABIEL CODDING, Jr., of North Attleborough, in the county of Bristol and State of Massachusetts, have invented new and useful Improvements in the Manufacture of Enameled Bracelets; and I do hereby declare that the following is a full, clear, and exact description thereof, which will enable those skilled in the art to make and use the same, reference being had to the accompanying drawings, forming part of this specification, in which—

Figure 1 is a perspective view of my improved bracelet. Fig. 2 is a cross-section, showing the position of the parts before the flanged edges of the inner plate are bent down upon the enamel. Fig. 3 is a cross-section of the bracelet complete. Fig. 4 is a cross-section in red, showing the method heretofore followed in making enameled bracelets.

Similar letters of reference indicate corresponding parts.

The object of this invention is to provide a more simple and inexpensive method of manufacturing a kind of bracelet called "enameled bracelets."

The process of manufacture consists, in general terms, in uniting the inner plate with the enameled plate, by means of two flanged edges on the inner plate, the said flanged edges being bent upon the fillet of enamel or enameled plate laid around and against the inner plate, within the flanged edges of the latter.

Heretofore it was the custom to strike up a convex plate, *e*, Fig. 4, with a recess in its convex surface, in which the enamel *f* was inlaid, and to solder on the inner plate, *g*, as shown. This method involved considerable skill and time in putting in the enamel, and the bracelet so made was liable to become damaged by its peeling out of the recess.

By my improved method, however, these objections are obviated.

In the drawings, *a* is the inner plate, of sheet metal, formed by any proper tool or machine with upset or flanged edges *c c*. *d* is an enameled plate, of sheet metal, formed with a concavo-convex cross-section by means of any proper tool, or by running it through suitable rolls. This plate is then laid with the flanges *c c*, and the latter are pressed down against the enameled surface, as shown at Figs. 3 and 4.

Instead of an enameled plate of sheet metal a solid fillet of any suitable enameling matter having a plano-convex cross-section may be substituted, and the edges *c c* pressed down upon it, as before described.

By means of my invention I am enabled to employ an enameled plate of metal or any solid substitute or imitation of the same, as hard rubber and other like matter.

The edges *c c* are bent down in practice by running the two plates through a semicircular opening through a plate, or through any other suitable device.

The plate *a* may be of gold or a plated imitation of the same.

The enameling matter is the same commonly used in making enameled work, and may be of any color desired or jet imitation.

I desire to be understood as not limiting myself to the use of enameled plates only, in the manner set forth, for a plain plate of metal may be united with the inner plate, *a*, in the manner set forth, and an improved construction of bracelet be obtained as when enameled plates are used.

I claim as new and desire to secure by Letters Patent—

The enameled bracelet formed by the sheet-metal base-plate *a*, having longitudinal flanges *c c*, and the enameled concavo-convex plate *d*, adapted to fit between and to be secured in place by the flanges *c*, substantially as described, for the purpose specified.

A. CODDING, JR.

Witnesses:
ARTHUR E. CODDING,
T. I. SMITH.